(12) United States Patent
Akiyama

(10) Patent No.: US 12,449,540 B2
(45) Date of Patent: Oct. 21, 2025

(54) METHOD FOR DETECTING PLANT GROWTH AMOUNT, PLANT SENSOR, AND FERTILIZING APPARATUS

(71) Applicant: TOPCON Corporation, Tokyo-to (JP)

(72) Inventor: Shugo Akiyama, Tokyo-to (JP)

(73) Assignee: TOPCON CORPORATION, Tokyo-to (JP)

( * ) Notice: Subject to any disclaimer, the term of this patent is extended or adjusted under 35 U.S.C. 154(b) by 1065 days.

(21) Appl. No.: 17/481,587

(22) Filed: Sep. 22, 2021

(65) Prior Publication Data

US 2022/0099835 A1 Mar. 31, 2022

(30) Foreign Application Priority Data

Sep. 25, 2020 (JP) .................................. 2020-160877
Jun. 4, 2021 (JP) .................................. 2021-094249

(51) Int. Cl.
*G01S 17/89* (2020.01)
*A01C 15/00* (2006.01)
(Continued)

(52) U.S. Cl.
CPC ............ *G01S 17/89* (2013.01); *A01C 15/005* (2013.01); *G01N 21/55* (2013.01); *G01S 7/4817* (2013.01); *G01S 7/4876* (2013.01)

(58) Field of Classification Search
CPC ....... A01C 15/005; A01C 17/00; A01C 21/00; A01C 21/007; A01G 22/00; A01G 22/15; A01M 7/0089; G01B 11/0608; G01J 2003/102; G01J 2003/425; G01J 3/10; G01J 3/42; G01J 3/427; G01N 2021/1797; G01N 2021/8466; G01N 21/255; G01N 21/314;
(Continued)

(56) References Cited

U.S. PATENT DOCUMENTS 10,408,678 B2 * 9/2019 Zhao .......................... G01J 3/42
11,275,154 B2 * 3/2022 Ishinabe .................. G01S 17/89
(Continued)

FOREIGN PATENT DOCUMENTS

EP 3306303 A1 4/2018
JP 2016-208859 A 12/2016
(Continued)

OTHER PUBLICATIONS

European communication dated May 8, 2024 in corresponding European patent application No. 21197953.9.
(Continued)

*Primary Examiner* — John R Lee
(74) *Attorney, Agent, or Firm* — Nields, Lemack & Frame LLC

(57) ABSTRACT

A scan using a pulsed distance measuring light with two wavelengths of which reflectances are different with respect to a content of a nitrogen by a laser scanner, the two wavelengths are separated, lights are received, a distance measurement value and a light amount are detected for each pulsed distance measuring light and for each of the two wavelengths, a height of a crop is detected based on the distance measurement value, a received light amount ratio of the two wavelengths is detected, and a growth condition of the crop is detected based on the detected height and the received light amount ratio.

9 Claims, 5 Drawing Sheets

(51) Int. Cl.
 *G01N 21/55* (2014.01)
 *G01S 7/48* (2006.01)
 *G01S 7/481* (2006.01)
 *G01S 7/487* (2006.01)

(58) Field of Classification Search
 CPC .. G01N 21/3151; G01N 21/359; G01N 21/55; G01N 33/0098; G01S 17/88; G01S 17/89; G01S 7/48; G01S 7/481; G01S 7/4817; G01S 7/483; G01S 7/486; G01S 7/487; G01S 7/4876
 See application file for complete search history.

(56) References Cited

U.S. PATENT DOCUMENTS

| | | | | |
|---|---|---|---|---|
| 11,402,506 | B2* | 8/2022 | Ohtomo | G01S 7/4815 |
| 11,895,953 | B2* | 2/2024 | Heaven | A01G 7/00 |
| 2013/0003040 | A1* | 1/2013 | Yoshino | G01S 7/497 |
| | | | | 356/5.01 |
| 2013/0010278 | A1* | 1/2013 | Ohmuro | G01S 17/10 |
| | | | | 356/4.01 |
| 2018/0299327 | A1 | 10/2018 | Zhao et al. | |
| 2019/0261551 | A1 | 8/2019 | Yoshida et al. | |
| 2021/0056685 | A1* | 2/2021 | Zhang | G06T 7/0012 |
| 2022/0099835 | A1* | 3/2022 | Akiyama | G01S 7/4817 |
| 2022/0256789 | A1* | 8/2022 | Heaven | G01N 21/3554 |

FOREIGN PATENT DOCUMENTS

| | | |
|---|---|---|
| JP | 2019-146562 A | 9/2019 |
| JP | 2019-175246 A | 10/2019 |
| WO | 2010/110040 A1 | 9/2010 |

OTHER PUBLICATIONS

European communication dated Feb. 8, 2022 in corresponding European patent application No. 21197953.9.

Eitel et al., "Early Season Remote Sensing of Wheat Nitrogen Status Using a Green Scanning Laser", Agricultural and Forest Meteorology, vol. 151, pp. 1338-1345, 2011.

* cited by examiner

METHOD FOR DETECTING PLANT GROWTH AMOUNT, PLANT SENSOR, AND FERTILIZING APPARATUS

BACKGROUND OF THE INVENTION

The present invention relates to a method for detecting plant growth amount for detecting a growth condition of a plant, a plant sensor for detecting a growth condition of a plant and a fertilizing apparatus for performing a fertilization suitable for a growth condition.

It is important to detect a growth condition of plants, especially crops in a production management of crops. In usual method as disclosed in Japanese Patent Application Publication No. 2016-208859, a detection light diffused in one direction is irradiated, and a growth condition is detected based on a detection of a reflected light from leaves of plans.

On the other hand, this reflected light includes a reflected light from a soil other than leaves of plants, and the reflected light other than the leaves is a noise component.

SUMMARY OF INVENTION

It is an object of the present invention to provide a method for detecting plant growth amount and a plant sensor capable of accurately detecting a growth condition of a plant, and to provide a fertilizing apparatus capable of appropriately fertilizing corresponding to a growth condition.

To attain the object as described above, a method for detecting a plant growth amount according to the present invention comprises performing a scan using a pulsed distance measuring light with two wavelengths, of which reflectances are different with respect to a content of a nitrogen, by a laser scanner, separating the two wavelengths, receiving separated lights, detecting a distance measurement value and a light amount for each pulsed distance measuring light and for each of the two wavelengths, detecting a height of a crop based on the distance measurement value, detecting a received light amount ratio of the two wavelengths, and detecting a growth condition of the crop based on the detected height and the received light amount ratio.

Further, in the method for detecting the plant growth amount according to a preferred embodiment, the two wavelengths of the pulsed distance measuring light are 735 nm and 809 nm.

Further, in the method for detecting the plant growth amount according to a preferred embodiment, when detecting a height of the crop based on the distance measurement value, a threshold value is provided, and the distance measurement data deviating from the threshold value is eliminated as the noise data for each pulsed distance measuring light, and when detecting a growth condition of the crop based on the received light amount ratio, a threshold value is provided for each pulsed distance measuring light, and a received light amount ratio data deviating from the threshold value is eliminated as the noise data.

A plant sensor according to the present invention comprises a laser scanner which includes a light emitter for emitting pulsed distance measuring lights with two wavelengths, a scan mirror for scanning the pulsed distance measuring lights, a light receiver for receiving a reflected pulsed distance measuring light from an object for each pulsed distance measuring lights and for each of the two wavelengths, and a distance measuring module for obtaining a distance measurement value for each pulsed distance measuring light and for each wavelength, a light amount detector for detecting a received light amount of a reflected pulsed distance measuring light received by the light receiver for each pulsed distance measuring light, and a growth amount/fertilizer amount calculating module, wherein the growth amount/fertilizer amount calculating module is configured to detect a distance measurement value and a light amount for each pulsed distance measuring light and for each of the two wavelengths, to calculate a height of a crop based on the distance measurement value, to detect a received light amount ratio of the two wavelengths, to calculate a growth condition of the crop based on the detected height and the received light amount ratio, and to detect a plant growth amount based on two calculation results.

Further, in the plant sensor according to a preferred embodiment, the two wavelengths of the pulsed distance measuring light are 735 nm and 809 nm.

Further, in the plant sensor according to a preferred embodiment, the growth amount/fertilizer amount calculating module has a threshold value for judging a propriety of the distance measurement data to detect a height of the crop, has a threshold value for judging a propriety of received light amount ratio data, and is configured to judge the propriety of the distance measurement data and the propriety of the received light amount ratio data based on the respective threshold values for each pulsed distance measuring light, and to eliminate the distance measurement data and the received light amount ratio data deviating from the threshold values as the noise data.

Furthermore, a fertilizing apparatus according to the present invention comprises the plant sensor described above provided on a front side of an agricultural machine, a fertilizer spreader provided on a rear side of the agricultural machine, and a controller, wherein the controller is configured to determine a fertilizer spreading amount based on a plant growth amount acquired from the plant sensor, to control the fertilizer spreader, and to perform the fertilization.

According to the present invention, a scan using a pulsed distance measuring light with two wavelengths, of which reflectances are different with respect to a content of a nitrogen, is performed by a laser scanner, the two wavelengths are separated, separated lights are received, a distance measurement value and a light amount are detected for each pulsed distance measuring light and for each of the two wavelengths, a height of a crop is detected based on the distance measurement value, a received light amount ratio of the two wavelengths is detected, and a growth condition of the crop is detected based on the detected height and the received light amount ratio. As a result, a growth condition of the crop is detected by two detection elements, which improves an accuracy, and a growth condition of the crop is detected for each pulse, which enables instantaneously acquiring many data and improving a measurement accuracy.

DETAILED DESCRIPTION OF THE PREFERRED EMBODIMENT

A description will be given below on an embodiment of the present invention by referring to the attached drawings.

Figure 1:
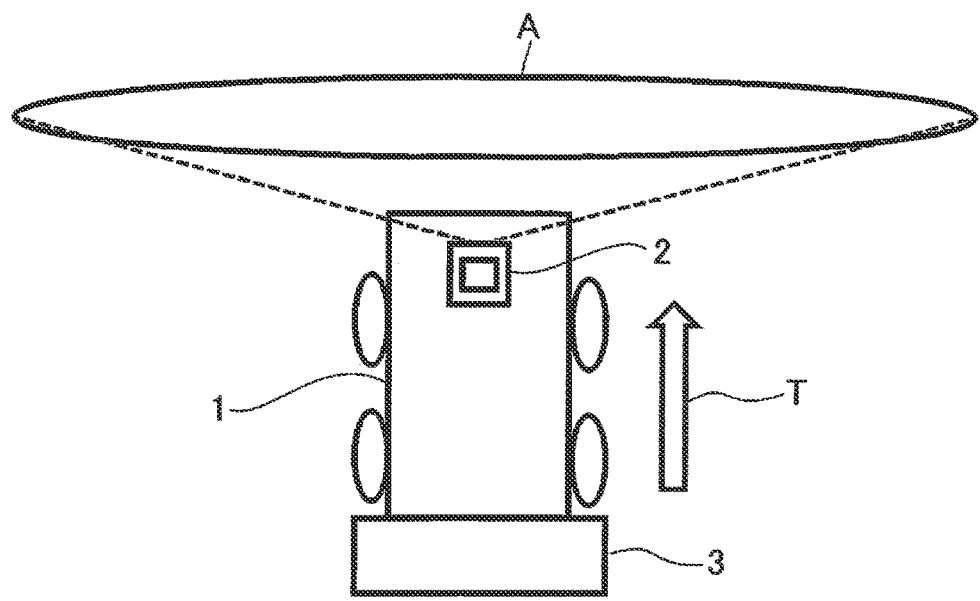
FIG. 1 is a schematic drawing of an agricultural machine including a plant sensor and a fertilizing apparatus according to an embodiment of the present invention.

FIG. 1 is a schematic drawing of an agricultural machine including a plant sensor according to the embodiment.

In FIG. 1, a reference numeral 1 denotes an agricultural machine, a reference numeral 2 denotes a plant sensor, a reference numeral 3 denotes a fertilizer spreader, and a reference character A denotes a growth amount detection range by the plant sensor 2.

As the agricultural machine 1, a tractor is shown as an example. The plant sensor 2 is provided on a front side of the agricultural machine 1, and the fertilizer spreader 3 is provided on a rear side of the agricultural machine 1.

The plant sensor 2 and a fertilizing position of the fertilizer spreader 3 have a known positional relationship. A horizontal distance between the plant sensor 2 and the fertilizer spreader 3 is also known with respect to a traveling direction T of the agricultural machine 1.

The plant sensor 2 detects growth conditions of plants. The fertilizer spreader 3 spreads a fertilizer (fertilization), and a fertilizer amount is controlled by a controller (to be described later), corresponding to a growth condition detected by the plant sensor 2.

In the present embodiment, the plant sensor 2 includes a laser scanner 4 (see FIG. 4) which irradiates distance measuring lights P1, P2 with two wavelengths. As the two wavelengths to be adopted, wavelengths with reflectances, which differ due to a content of the nitrogen in a crop, are used.

Figures 2A, 2B:
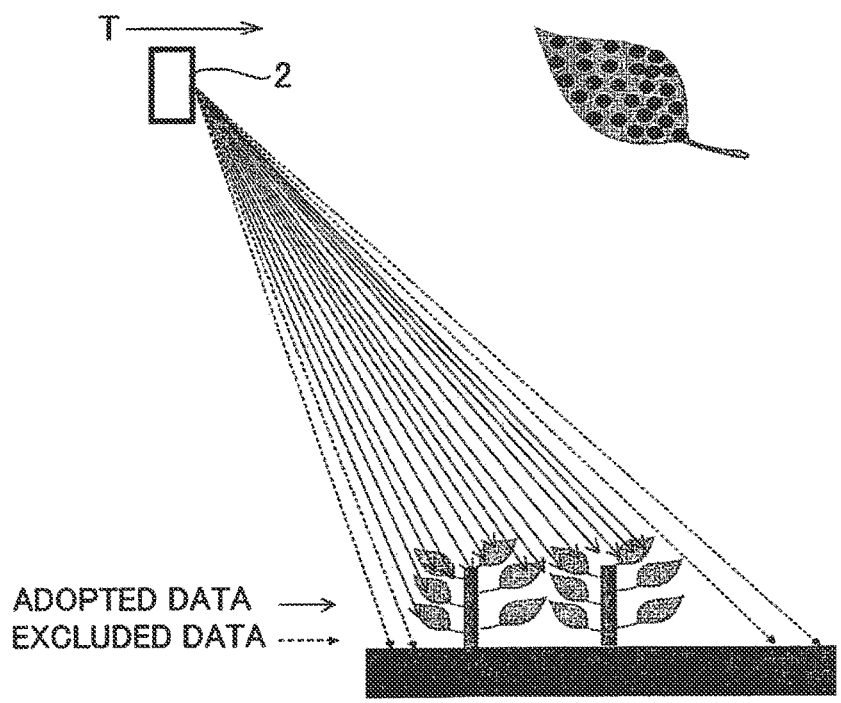
FIG. 2A is an explanatory drawing showing a detecting operation for a growth amount of a crop by the plant sensor.
FIG. 2B is an explanatory drawing showing a relationship between a leaf of the crop and measuring points.

As shown in FIG. 2A, the laser scanner 4 is configured to line-scan the front of the agricultural machine 1 with the distance measuring lights P1, P2 in a direction orthogonal to the traveling direction T. It is to be noted that FIG. 2 shows that a scan line has some width in the traveling direction for ease of explanation but, in fact, the scan line has no or very little width. The laser scanner 4 is good enough to be able to line-scan and may be a line scanner which performs scanning in one axis.

The laser scanner 4 has a measurement reference position, and a horizontal distance between the measurement reference position and a fertilizing position of the fertilizer spreader 3 is known. Further, a vertical distance between the measurement reference position and the ground surface (a vertical distance between the measurement reference position and a traveling surface of the agricultural machine 1) is also known.

The laser scanner 4 performs a one-line scan at predetermined time intervals. Here, the one-line scan means at least one scan or a plurality of scans. The distance measuring lights P1, P2 of the two wavelengths are irradiated to the same optical axis, and the distance measurements are performed by each of the distance measuring lights of the two wavelengths. As the distance measurement, like a normal laser scanner, a pulsed distance measuring light (which will be referred to as a pulsed light hereinafter) is emitted and reflected by an object, and a distance is measured with the use of a reciprocating time of a reflected pulsed distance measuring light (which will be referred to as a reflected pulsed light) as received and the light velocity. Hence, the distance measurement data for each of the pulsed lights can be acquired along a scan line.

The reflected distance measuring lights include a light reflected by a leaf of a crop (which is indicated by a solid line in FIG. 2) and a light reflected by a portion other than the leaf, e.g., a soil (which is indicated by a broken line in FIG. 2), and as the data for determining a growth condition of the crop, the light reflected by the soil becomes the unnecessary data i.e., the noise.

Further, since the distance measurement is performed by each pulsed light, distance measurement data as acquired from a distance measurement result can be determined whether the distance measurement data corresponds to the reflection by the leaf or the reflection by the soil measurement result. Therefore, a noise can be removed based on the distance measurement result.

Then, two different wavelengths are used as the distance measuring lights P1, P2, and there are 735 nm and 809 nm as examples of the two wavelengths.

When a laser beam with a wavelength of 735 nm is used as the distance measuring light, it is known that the laser beam is reflected by an object if the object contains the nitrogen, but a reflected light amount is not affected by a magnitude of a content of the nitrogen.

When a laser beam with a wavelength of 809 nm is used as the distance measuring light, it is known that the laser beam is reflected by an object if the object contains the nitrogen, a reflectance differs depending on a content of the nitrogen, and a reflected light amount also increases as the content rises.

Further, it is also known that leaves of the crop contain the nitrogen, and the content of the nitrogen is larger when a growth condition is good and the content of the nitrogen is small when the growth condition is poor.

It is to be noted the soil may contain the nitrogen, but the soil and the leaf have greatly different reflectances (the reflectance of the soil is considerably small), and hence by comparing reflected light amounts alone regardless of wavelength, a reflected light can be judged whether the reflection from the soil or the reflection from the leaf. FIG. 2B shows a state where the leaf is irradiated by the distance measuring light.

As described above, both the distance measuring light P1 with the wavelength of 735 nm and the distance measuring light P2 with the wavelength of 809 nm are irradiated to the same optical axis, and hence the distance measuring light P1 and the distance measuring light P2 are irradiated to the same measuring point. A reflected light amount is affected and changed by properties of a reflecting surface or a state of the reflecting surface, e.g., dirt. However, since the distance measuring light P1 and the distance measuring light P2 are irradiated to the same point on the reflecting surface, the effect of the reflecting surface regarding the distance measuring light P1 is the same as that regarding the distance measuring light P2.

Therefore, the magnitude of the reflected light amount of each of the distance measuring light P1 and the distance measuring light P2, i.e., the magnitude of a received light amount is determined to be based on the magnitude of the content of the nitrogen. When dividing the light amount of the distance measuring light P2 by the light amount of the distance measuring light P1, a nitrogen content ratio can be revealed with respect to the measuring point. When a nitrogen content ratio of a leaf of a crop corresponding to a growth condition is acquired in advance, the growth condition of the crop can be determined at the measuring point.

Next, since a nitrogen content of a soil is considerably lower than that of a leaf of a crop, a reflected light amount from a soil is significantly small. By detecting the reflected light amount, it is revealed that the measuring point is a location other than the leaf. It is possible to judge from the reflected light amount whether a measurement data corresponds to a reflection by the leaf or a reflection by the soil. Therefore, a noise can be removed based on a light amount result.

Further, since the distance measuring light is a pulsed light, a reflected light amount of when performing no distance measurement can be detected. The reflected light amount of when performing no distance measurement can be acquired as a dark noise, and by subtracting the dark noise, it is possible to also remove an outside light noise.

As described above, a noise or a non-noise can be determined for each pulsed light based on a distance measurement result and a light amount detection result, and it is possible to remove a distance measurement data as judged a noise.

Regarding pulsed lights (the distance measuring light P1, the distance measuring light P2) from which the noise has been removed, a received light amount of the distance measuring light P1 is compared with that of the distance measuring light P2, and a received light amount ratio is acquired. The received light amount ratio corresponds to a nitrogen content ratio of the leaf of the crop. Therefore, by acquiring a relationship between the received light amount and the nitrogen content ratio in advance, it is possible to obtain an accurate nitrogen content ratio of the leaf of the crop based on the received light amount ratio.

As a determination data of a growth condition, an average value for each scan line is acquired and used as the data for the determination of a growth condition. Alternatively, an average value per a plurality of scan lines may be acquired and used as the determination data of a growth condition.

A data regarding a fertilizer amount corresponding to the determination data of a growth condition is acquired in advance. A fertilizer amount is obtained based on the determination data of a growth condition, and an amount of the fertilizer spreading by the fertilizer spreader 3 is controlled.

Figure 3:
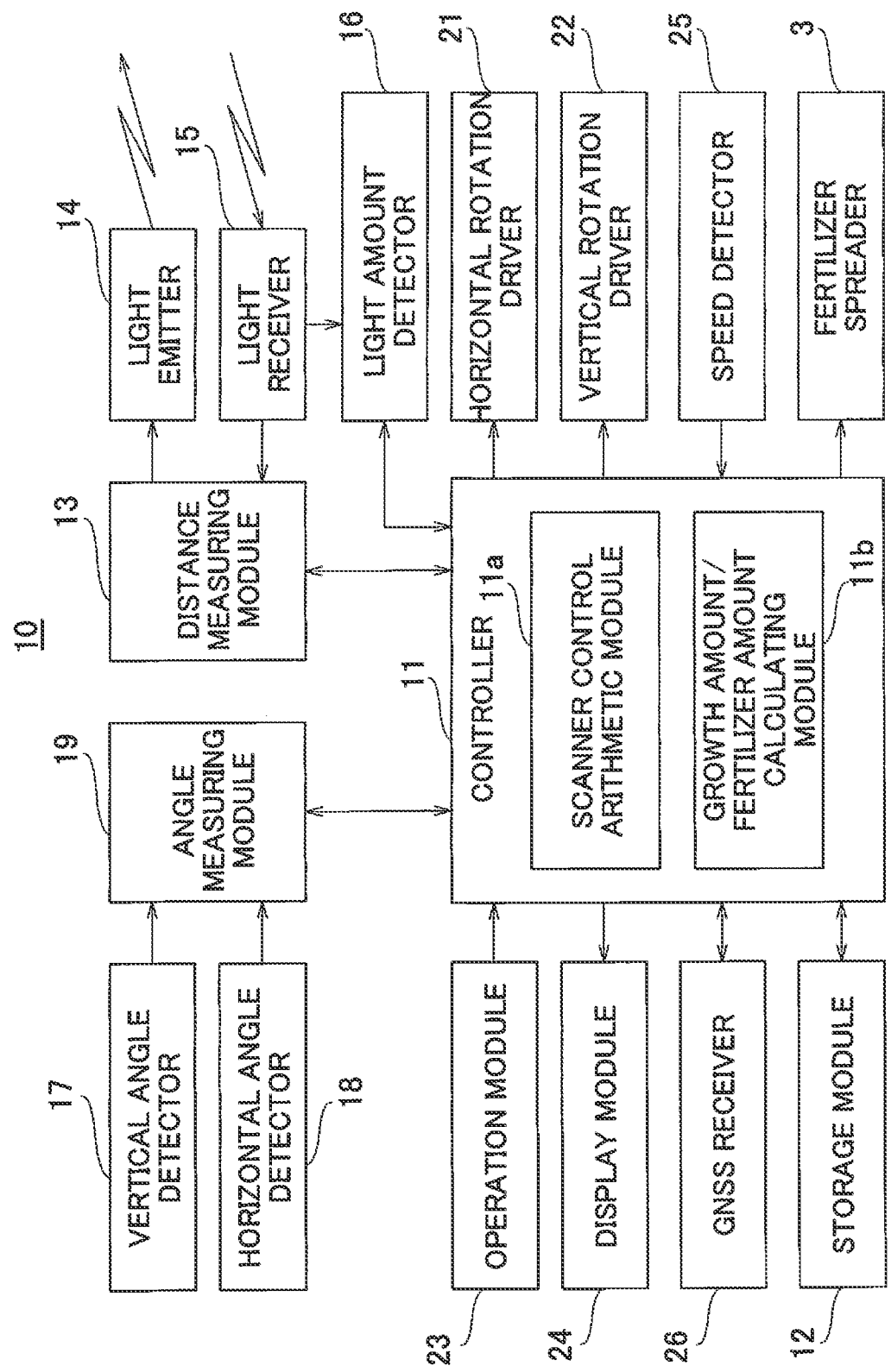
FIG. 3 is a block diagram showing an outline of the plant sensor and the agricultural machine.
Figure 4:
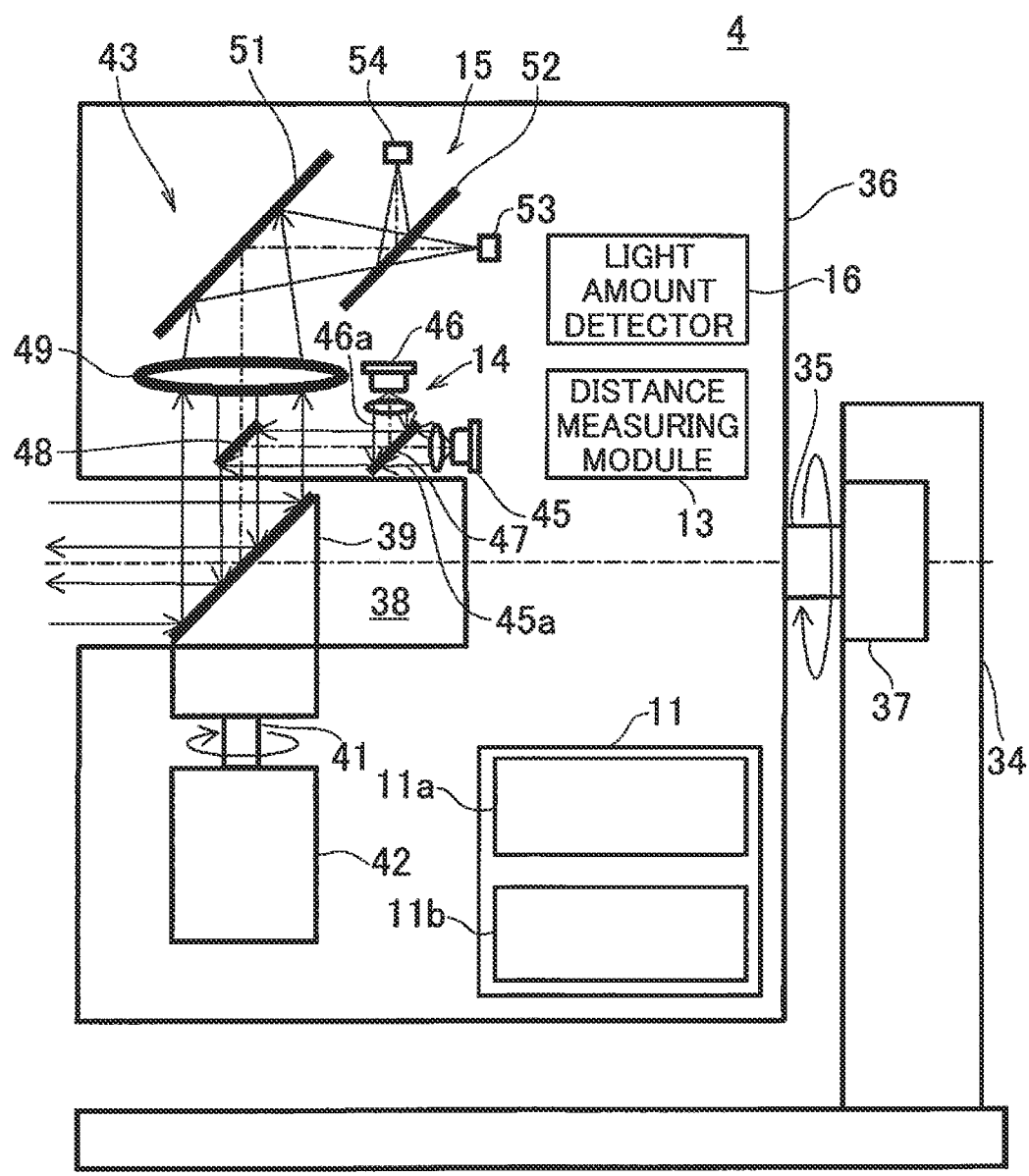
FIG. 4 is a schematic block diagram of a laser scanner.

FIG. 3 shows a schematic block diagram of a plant sensor and a fertilizing apparatus 10 having the plant sensor, and FIG. 4 shows a schematic block diagram of the plant sensor 2.

In FIG. 3, a reference numeral 11 denotes a controller, and the controller 11 includes a scanner control arithmetic module 11a and a growth amount/fertilizer amount calculating module 11b. Further, in FIG. 3, a reference numeral 12 denotes a storage module, a reference numeral 13 denotes a distance measuring module, a reference numeral 14 denotes a light emitter, a reference numeral 15 denotes a light receiver, a reference numeral 16 denotes a light amount detector, a reference numeral 17 denotes a vertical angle detector, a reference numeral 18 denotes a horizontal angle detector, a reference numeral 19 denotes an angle measuring module, a reference numeral 21 denotes a horizontal rotation driver, a reference numeral 22 denotes a vertical rotation driver, a reference numeral 23 denotes an operation module, a reference numeral 24 denotes a display module, a reference numeral 25 denotes a speed detector, and a reference numeral 26 denotes a GNSS receiver.

As the controller 11, the scanner control arithmetic module 11a and the growth amount/fertilizer amount calculating module 11b, a CPU as specialized to the present embodiment, a general-purpose CPU, an embedded CPU, a microprocessor, and the like are used. Further, as the storage module 12, a semiconductor memory such as a RAM, a ROM, or a Flash ROM, or a DRAM, a magnetic recording memory such as an HDD, or an optical recording memory such as a CDROM is used. It is to be noted that, as the scanner control arithmetic module 11a and the growth amount/fertilizer amount calculating module 11b, a part of the controller 11 may be allocated.

The scanner control arithmetic module 11a controls a distance measuring operation of the later-described laser scanner. The growth amount/fertilizer amount calculating module 11b calculates and judges a growth amount and a growth condition from a detection result of the later-described plant sensor, and also controls a fertilizer amount by the fertilizer spreader 3.

In the storage module 12, a sequence program for operating the laser scanner, a distance measurement program for performing a distance measurement, a program for judging a growth condition from a light receiving data, a noise removal program for removing a data serving as a noise from a distance measurement data and the light receiving data, a program for judging a growth condition, a fertilization control program for calculating a fertilizer spreading amount corresponding to a growth condition and performing a fertilization, and the like. Further, in the storage module 12, a measurement data, a growth condition determination data are stored, and various kinds of data, such as a table data, in which a fertilizer amount corresponding to a growth condition is set, are stored. Further, in the noise removal program, threshold values required for a noise determination are set, such as a threshold value concerning the distance measurement and a threshold value concerning a light amount. The threshold values include threshold values to set an upper limit and a lower limit, and a threshold value to set a range.

The distance measuring module 13 makes the light emitter 14 to emit a light, receives a light receiving signal from the light receiver 15, acquires a measurement distance based on a light emitting timing from the light emitter 14, a light receiving timing from the light receiver 15 and the light velocity, and the distance measuring module 13 functions as an electronic distance meter. The angle measuring module 19 calculates a vertical angle and a horizontal angle of a measuring point based on detection results of the vertical angle detector 17 and the horizontal angle detector 18.

The horizontal rotation driver 21 drives and controls a later-described rotation motor 42, and the vertical rotation driver 22 drives and controls a vertical motor 37 (to be described later).

The speed detector 25 detects a moving speed of the agricultural machine 1, and inputs a detection result to the controller 11. The GNSS receiver 26 acquires global coordinates of the laser scanner.

The laser scanner 4 is mainly made up by the scanner control arithmetic module 11a, the storage module 12, the distance measuring module 13, the light emitter 14, the light receiver 15, the vertical angle detector 17, the horizontal angle detector 18, the angle measuring module 19, the horizontal rotation driver 21 and the vertical rotation driver 22.

The plant sensor 2 is mainly made up by the laser scanner 4, a light amount detector 16, and the growth amount/fertilizer amount calculating module 11b.

First, a description will be given on the laser scanner 4 by referring to FIG. 4.

A pedestal 36 is supported to a base 34 via a vertical rotation shaft 35 with an axis horizontal. A vertical motor 37 is coupled to the vertical rotation shaft 35, and the vertical motor 37 rotates the pedestal 36 in the vertical direction around the vertical rotation shaft 35.

The pedestal 36 has a recess portion 38, a scan mirror 39 is provided in the recess portion 38, and the scan mirror 39 is supported by a horizontal rotation shaft 41. An axis of the horizontal rotation shaft 41 is orthogonal to an axis of the vertical rotation shaft 35, and a horizontal rotation motor 42 is coupled to the horizontal rotation shaft 41. The scan mirror 39 is configured to rotate in the horizontal direction around the horizontal rotation shaft 41 by the horizontal rotation motor 42.

The base 34 is mounted on the agricultural machine 1 in such a manner that the axis of the horizontal rotation shaft 41 becomes parallel to the traveling direction T of the agricultural machine 1 and tilts downward at a predetermined angle with respect to the verticality.

Further, a distance measuring optical system 43 is accommodated in the pedestal 36.

The distance measuring optical system 43 has a first light source 45 which emits a first laser beam as a pulsed light with a wavelength of 735 nm, a second light source 46 which emits a second laser beam as a pulsed light with a wavelength of 809 nm, and a first wavelength selection mirror 47, as the light emitter 14. The first laser beam and the second laser beam are emitted at the same timing.

A first wavelength selection mirror 47 is provided on an optical axis of the first light source 45. The first wavelength selection mirror 47 has wavelength selection characteristics to transmit a wavelength of 735 nm therethrough and reflect a wavelength of 809 nm. The first laser beam 45a is transmitted through the first wavelength selection mirror 47, and the second laser beam 46a is reflected onto the optical axis of the first light source 45 by the first wavelength selection mirror 47.

The first laser beam as transmitted through the first wavelength selection mirror 47 and the second laser beam as reflected on the first wavelength selection mirror 47 are deflected by a first deflection mirror 48 in such a manner that the first laser beam and the second laser beam are incident upon the scan mirror 39, and are reflected by the scan mirror 39 in a direction orthogonal to the axis of the horizontal rotation shaft 41.

The first laser beam and the second laser beam as reflected by the scan mirror 39 are projected in rotary irradiation (scan) by a rotation of the scan mirror 39. It is to be noted that, since a scan is performed by uniaxial rotations of the horizontal rotation shaft 41, and hence the scan is a one-dimensional scan, and a front side of the agricultural machine 1 is scanned.

The first laser beam and the second laser beam as reflected at an object enter the scan mirror 39, are reflected by the scan mirror 39, transmitted through a condenser lens 49, reflected by a second deflection mirror 51, and enter the light receiver 15.

The light receiver 15 has a second wavelength selection mirror 52, a first photodetector 53 and a second photodetector 54. The second wavelength selection mirror 52 has wavelength selection characteristics to transmit a wavelength of 735 nm therethrough and reflect a wavelength of 809 nm.

The first laser beam with the wavelength of 735 nm which enters the light receiver 15 is transmitted through the second wavelength selection mirror 52, and received by the first photodetector 53. The second laser beam with the wavelength of 809 nm which enters the light receiver 15 is reflected by the second wavelength selection mirror 52, and received by the second photodetector 54. The condenser lens 49 focuses the first laser beam and the second laser beam on the first photodetector 53 and the second photodetector 54 by its optical function, respectively.

The distance measuring module 13 controls emitting of the first laser beam by the first light source 45 and emitting of the second laser beam by the second light source 46, and performs the distance measurement for each pulsed light of the first laser beam and the second laser beam based on respective time differences between respective light emitting timings from the first light source 45 and the second light source 46 and respective light receiving timings from the first photodetector 53 and the second photodetector 54, and based on the light velocity. Hence, the point cloud data is acquired along a scan line.

Since the first laser beam and the second laser beam are irradiated on the same optical axis at the same timing, each pulsed light is irradiated to the same point for each pulsed light, and the same distance measurement result can be obtained.

Then, at the time when projecting the pulsed light, a vertical angle is detected by the vertical angle detector 17 and a horizontal angle is detected by the horizontal angle detector 18. By associating with angle measurement results and distance measurement results as provided by the distance measuring module 13, the data with three-dimensional coordinates per irradiating point of each pulsed light (the data with three-dimensional coordinates will be referred to as the three-dimensional data hereinafter). Therefore, the point cloud data has the three-dimensional data.

The scanner control arithmetic module 11a controls a rotation speed of the horizontal rotation motor 42 according to the distance measurement program, and controls a light emission interval of the respective pulsed lights via the distance measuring module 13. Further, the scanner control arithmetic module 11a controls the point cloud data density by controlling a rotation speed of the horizontal rotation motor 42 and by controlling an emission interval of each pulsed light.

Further, the GNSS receiver 26 is capable of acquiring global coordinates at a time of irradiating pulsed lights, and the scanner control arithmetic module 11a is capable of associating the distance measurement data as acquired by the laser scanner with the global coordinates.

Next, a description will be given on the plant sensor 2. As described above, the plant sensor 2 detects a growth condition, and the plant sensor 2 according to the present embodiment adopts a distance measurement value and a reflected light amount as parameters for detecting a growth condition.

In the present embodiment, the distance measurement data is acquired by the laser scanner per each pulsed light of the first laser beam and the second laser beam. Therefore, a clear difference in distance measurement value arises between a case where the leaf of the crop is irradiated by the pulsed light and a distance measurement is performed and a case where the soil is irradiated by the pulsed light and a distance measurement is performed (see FIG. 2). Further, a distance measurement accuracy of several cm or below can be obtained. Therefore, a distance measurement value is compared per each pulsed light and, for example, if a distance measurement value is larger and a difference from other distance measurement values is not smaller than a threshold value, it is determined that the distance measurement has been performed for the soil, and its distance measurement data is removed as the noise. As the threshold value, a distance measurement accuracy and an object are taken into consideration, and 2 cm is set, for example.

Based on the distance measurement data after the noise removal, a height of a crop is measured, and a growth condition is determined. If a height of a crop is to be determined, the measurement reference position may be determined as a reference, or the distance measurement data of the soil, which has been removed as the noise, may be determined as a reference.

In the present embodiment, a laser scan is performed with the use of the laser beams of two colors.

Further, the first photodetector 53 and the second photodetector 54 are configured respectively to produce a light receiving signal corresponding to a light amount of received pulsed light. The light receiving signals as output from the first photodetector 53 and the second photodetector 54 are input to the light amount detector 16. The light amount detector 16 calculates a received light amount based on the light receiving signal, and inputs a calculation result to the growth amount/fertilizer amount calculating module 11b.

A pulsed light which enters the light receiver 15 is separated into the first laser beam with the wavelength of 735 nm and the second laser beam with the wavelength of 809 nm by the second wavelength selection mirror 52, the first laser beam transmitted through the second wavelength selection mirror 52 is received by the first photodetector 53, and the second laser beam reflected by the second wavelength selection mirror 52 is received by the second photodetector 54.

As described above, the first laser beam with the wavelength of 735 nm is reflected by the object if the object contains a nitrogen, but its reflected light amount is not affected by a magnitude of a nitrogen content. Further, if the object contains a nitrogen, the second laser beam with the wavelength of 809 nm is reflected by the object, its reflectance differs depending on the nitrogen content, and its reflected light amount also increases as the content rises.

Since an irradiation point of the first laser beam and an irradiation point of the second laser beam are the same, it can be determined that a difference of reflected light amount depends on the nitrogen content of the leaf of the crop. Therefore, by acquiring a ratio of a received light amount of the second laser beam and the received light amount of the first laser beam, it is possible to detect a state of the nitrogen content of the leaf as the object, i.e., the crop and further to detect a growth condition of the crop.

Next, the soil rarely contains the nitrogen, or if containing the nitrogen, its content is far smaller than that of the crop. Therefore, the first laser beam and the second laser beam are hardly reflected from the soil, or if being reflected, reflected light amounts are very small. Therefore, a light receiving signal with a small received light amount can be determined as the noise.

Whether the signal is unnecessary (noise) or not can be judged based on both a distance measurement result and a light amount detection result.

Thus, as a detection signal of a growth condition, a height of the crop and a nitrogen content of the crop are acquired.

Further, there are quite many signals for the respective pulsed lights acquired by a laser scan, the noise can be removed from the signals, and when obtaining an average value of the acquired signals, it is possible to obtain a highly accurate and reliable plant growth amount detection.

Further, the growth amount/fertilizer amount calculating module 11b judges a growth condition based on a detection result provided by the plant sensor 2, i.e., the height of the crop and the nitrogen content of the crop, and judges whether a growth condition of the crop at the time of detection is good or poor.

Next, in the present embodiment, based on the growth condition as detected, a fertilizer spreading amount is calculated, and a fertilization is performed while controlling the fertilizer spreader 3.

A growth condition detection result is input to the growth amount/fertilizer amount calculating module 11b from the plant sensor 2, and a traveling speed of the agricultural machine 1 is input to the same from the speed detector 25.

Further, the fertilization control program and the fertilizer amount comparison data for a fertilizer amount corresponding to a growth condition are input to the storage module 12, the growth amount/fertilizer amount calculating module 11b calculates a fertilizer amount per unit time by the fertilizer spreader 3 based on the detected growth condition, the fertilizer amount comparison data and the traveling speed of the agricultural machine 1, and the growth amount/fertilizer amount calculating module 11b controls the fertilizer spreader 3 so that the fertilization can be performed with this fertilizer amount.

Further, there is a horizontal distance between a growth condition detecting position and a fertilizing position of the fertilizer spreader 3, and the fertilization is performed while considering a delay time until the fertilizing position of the fertilizer spreader 3 reaches the growth condition detecting position.

As described above, the horizontal distance between the growth condition detecting position, i.e., the scan position of the laser scanner 4 and the measurement reference position of the laser scanner 4 can be acquired from a measurement distance (a slope distance) provided by the laser scanner 4 and a vertical angle of the distance measuring light. Since the horizontal distance between the measurement reference position of the laser scanner 4 and the fertilizing position of the fertilizer spreader 3 is known, the horizontal distance between the growth condition detecting position and the fertilizing position of the fertilizer spreader 3 can be determined. Further, the delay time until the fertilizing position of the fertilizer spreader 3 reaches the growth condition detecting position can be determined based on this horizontal distance and the traveling speed of the agricultural machine 1.

Thus, the growth amount/fertilizer amount calculating module 11b enables to spread the fertilizer to an adequate position and by an adequate amount.

It is to be noted that the growth condition detecting position can be determined by the GNSS receiver 26, thereby the growth condition in an entire field can be grasped and mapped. When the growth condition is mapped, a growth tendency of the entire field can be comprehended, which can be exploited for an improvement in cropping plan or a farming program, e.g., the soil amendment.

In the embodiment as described above, the line scanner is described as the laser scanner 4 mounted on the plant sensor 2. But, the plant sensor 2 may be mounted on an UAV, for example, without mounting the plant sensor 2 on the agricultural machine 1. In this case, the laser scanner 4 which performs a two-dimensional scan may be used, and a growth condition may be detected per a predetermined area.

Figure 5:
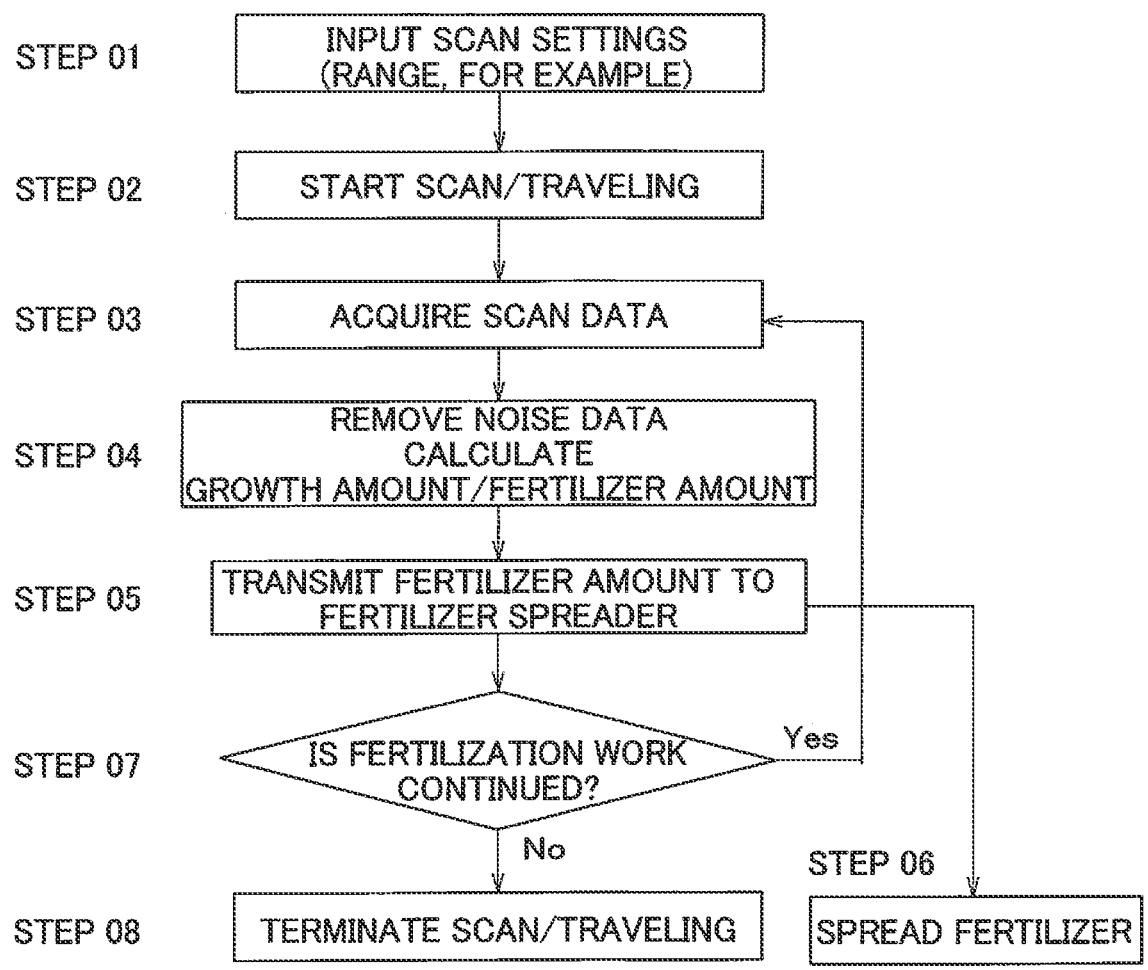
FIG. 5 is a flowchart showing a growth amount detection and a fertilizer spreading.

A description will be given on a flow from the growth condition detection to the fertilization by referring to FIG. 5.

(Step 01) Before starting the fertilization, conditions required for the fertilization are set. For example, a scan range (a length of a scan line: a scan length orthogonal to a traveling direction) provided by the laser scanner 4 is set. It is to be noted that the scan range is set as the setting of a reciprocating rotation angle of the scan mirror 39.

Further, as matters to be set, there are a traveling speed of the agricultural machine 1, a scan speed, a pulsed light emission interval, the number of times of scans per detection, and the like, and they are appropriately set in correspondence with a work condition or a work environment.

(Step 02) The agricultural machine 1 is traveled, and a scan by the laser scanner 4 is started, and the fertilization is started.

(Step 03) Under the set conditions, a scan is performed in the set range, and the scan data is acquired for each scan operation. It is to be noted that, as the scan, a uniaxial scan using the horizontal rotation shaft 41 is performed, and hence the scan is a line scan. Further, if a plurality of number of times of scans are set in the setting of one scan operation, the scan data for each time is acquired.

(Step 04) As to the acquired scan data, proprieties of a distance measurement value and a light amount value is determined for each pulse based on a predetermined threshold value. The data judged to be negative is eliminated as noise data. A growth amount is calculated based on the scan data from which the noise has been eliminated, and a fertilizer amount is calculated based on the growth amount.

(Step 05) The calculated fertilizer amount is transmitted to the fertilizer spreader 3.

(Step 06) The fertilizer spreader 3 performs to spread the fertilizer.

(Step 07) The fertilizer spreader 3 spreads the fertilizer based on the received fertilizer amount.

(Step 08) When the fertilizer amount is transmitted to the fertilizer spreader 3, it is judged whether the fertilizing work is to be continued or not and, if the continuation is judged, the processing returns to Step 03, a scan is performed, the scan data is acquired, and the work is continued.

Figure 6:
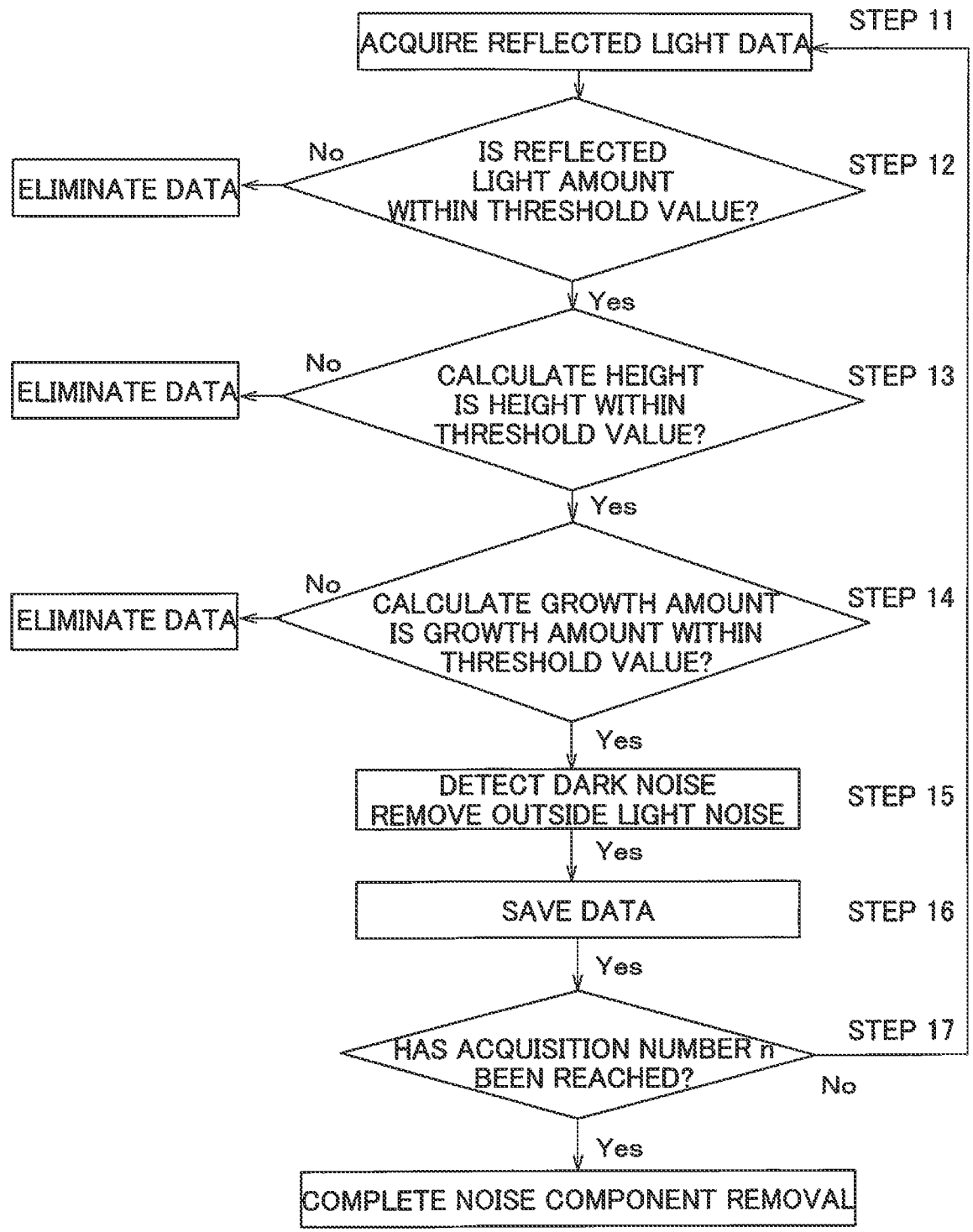
FIG. 6 is a flowchart showing a noise elimination in the growth amount detection.

Next, a description will be further given on the noise data removal in Step 04 by referring to FIG. 6.

As described above, the judgement on the propriety of the data is made for each pulse.

(Step 11) When the reflected light is received, a reflected light amount and a distance measurement value are acquired with respect to each of wavelengths (735 nm, 809 nm).

(Step 12) The reflected light amount is compared with the threshold value, and it is judged whether or not the reflected light amount is within the threshold value, namely, whether or not the reflected light amount is greater than the threshold value. A case where the reflected light amount is smaller than a lower limit threshold value corresponds to, e.g., a case of the reflection from the soil, and a case where the same is larger than an upper limit threshold value corresponds to a case of the reflection from a glass piece or the like, and both the cases are inappropriate as the data, and both data are judged to be negative and eliminated as the noise data.

It is to be noted that, in the judgement on a reflected light amount, the judgement may be made using a light amount for each of wavelengths, or the judgement may be made using a light amount for a total of wavelengths.

(Step 13) Each of distance measurement values for the respective wavelengths (735 nm, 809 nm) is compared with a threshold value, and it is judged whether or not each value is within the threshold value.

A distance measurement value for each pulsed light differs depending on each leaf, and a distance measurement value also differs in case of the reflection by the soil. Since the highest distance measurement value is obtained in case of the reflection by the soil, it is possible to judge that a distance measurement value smaller than a predetermined threshold value is obtained by the reflection by a leaf. The distance measurement data within a threshold value is adopted as the adequate data, and the distance measurement data beyond the threshold value is eliminated as the noise data.

(Step 14) A growth amount is calculated and it is judged whether or not the calculated growth amount is adequate. For example, in case of judging the growth amount based on a distance measurement value, a height of a crop is calculated from the distance measurement value, the judgement is made on, e.g., whether the height of the crop is within a predetermined threshold value with respect to an average value in a growth inspection period, or whether the height is within the threshold value with respect to a height assumed in a growth plan.

Further, in case of judging a growth amount using a distance measurement value based on a nitrogen amount contained in a leaf of the crop, a content of the nitrogen is calculated from a light amount ratio of the two wavelengths 735 nm and 809 nm, and the judgement is made on, e.g., whether the content of the nitrogen is within a predetermined threshold value with respect to an average value in the growth inspection period, or whether the content of the nitrogen is within the threshold value with respect to a content of the nitrogen assumed in a growth plan.

It is to be noted that a content of the nitrogen with respect to a light amount ratio of the wavelengths 735 nm and 809 nm is acquired in advance, and stored in the storage module 12 as the table data.

Further, when the growth amount acquired from the distance measurement data and the light amount data considerably deviates from the threshold value, it is judged that the distance measurement data is abnormal, and the data is eliminated.

Further, the noise data elimination in Step 14 can be omitted depending on a condition of the noise data elimination in Step 12 or Step 13.

(Step 15) A light amount is detected when a pulsed light is OFF, and the dark noise is detected. The dark noise is removed from a light amount in the distance measurement as the outside light noise. Thereby, S/N can be improved.

(Step 16) The remaining data is the adequate data alone due to the elimination of the noise data in Step 12, Step 13, and Step 14, and the remaining data is stored in the storage module 12 as the high-quality growth data detected by the plant sensor 2 by removing the outside light noise in Step 15.

(Step 17) The noise removal is carried out for each pulsed light, and it is judged whether or not the noise removal has been carried out to all the pulsed lights in one scan line. In a case where it is judged that the noise removal has been carried out with respect to all the pulsed lights, the noise removal is completed for the one scan line, and when the fertilizing work is finished, detecting operation of the plant sensor 2 is stopped. Further, when the fertilizing work is continued, the acquisition of the growth amount data by the plant sensor 2 and the noise removal are continued with respect to a next scan operation.

The invention claimed is:

1. A method for detecting a plant growth amount comprising:
   performing a scan using a pulsed distance measuring lights with two respective wavelengths, of which reflectances are different with respect to a content of a nitrogen, by a laser scanner, separating said two wavelengths, receiving separated lights,
   detecting a distance measurement value and a light amount for each pulsed distance measuring light and for each of said two wavelengths, detecting a height of a crop based on said distance measurement value, detecting a received light amount ratio of said two wavelengths, and detecting a growth condition of said crop based on said detected height and said received light amount ratio.

2. The method for detecting the plant growth amount according to claim 1, wherein said two wavelengths of said pulsed distance measuring light are 735 nm and 809 nm.

3. The method for detecting the plant growth amount according to claim 1, wherein, when detecting a height of said crop based on said distance measurement value, a threshold value is provided, and the distance measurement data deviating from said threshold value is eliminated as the noise data for each pulsed distance measuring light, and when detecting a growth condition of said crop based on said received light amount ratio, a threshold value is provided for each pulsed distance measuring light, and a received light amount ratio data deviating from said threshold value is eliminated as the noise data.

4. A plant sensor comprising:

a laser scanner which includes a light emitter for emitting pulsed distance measuring lights with two respective wavelengths, a scan mirror for scanning said pulsed distance measuring lights, a light receiver for receiving a reflected pulsed distance measuring light from an object for each pulsed distance measuring lights and for each of said two wavelengths, and a distance measuring module for obtaining a distance measurement value for each pulsed distance measuring light and for each wavelength, a light amount detector for detecting a received light amount of a reflected pulsed distance measuring light received by said light receiver for each pulsed distance measuring light, and a growth amount/fertilizer amount calculating module, wherein said growth amount/fertilizer amount calculating module is configured to detect a distance measurement value and a light amount for each pulsed distance measuring light and for each of said two wavelengths, to calculate a height of a crop based on said distance measurement value, to detect a received light amount ratio of said two wavelengths, to calculate a growth condition of said crop based on said detected height and said received light amount ratio, and to detect a plant growth amount based on two calculation results.

5. The plant sensor according to claim 4, wherein said two wavelengths of said pulsed distance measuring light are 735 nm and 809 nm.

6. The plant sensor according to claim 4, wherein said growth amount/fertilizer amount calculating module has a threshold value for judging a propriety of the distance measurement data to detect a height of said crop, has a threshold value for judging a propriety of received light amount ratio data, and is configured to judge the propriety of said distance measurement data and the propriety of said received light amount ratio data based on said respective threshold values for each pulsed distance measuring light, and to eliminate said distance measurement data and said received light amount ratio data deviating from said threshold values as the noise data.

7. A fertilizing apparatus comprising:

the plant sensor according to claim 4 provided on a front side of an agricultural machine, a fertilizer spreader provided on a rear side of said agricultural machine, and a controller, wherein said controller is configured to determine a fertilizer spreading amount based on a plant growth amount acquired from said plant sensor, to control said fertilizer spreader, and to perform the fertilization.

8. The method for detecting the plant growth amount according to claim 2, wherein, when detecting a height of said crop based on said distance measurement value, a threshold value is provided, and the distance measurement data deviating from said threshold value is eliminated as the noise data for each pulsed distance measuring light, and when detecting a growth condition of said crop based on said received light amount ratio, a threshold value is provided for each pulsed distance measuring light, and a received light amount ratio data deviating from said threshold value is eliminated as the noise data.

9. The plant sensor according to claim 5, wherein said growth amount/fertilizer amount calculating module has a threshold value for judging a propriety of the distance measurement data to detect a height of said crop, has a threshold value for judging a propriety of received light amount ratio data, and is configured to judge the propriety of said distance measurement data and the propriety of said received light amount ratio data based on said respective threshold values for each pulsed distance measuring light, and to eliminate said distance measurement data and said received light amount ratio data deviating from said threshold values as the noise data.

\* \* \* \* \*